No. 853,564. PATENTED MAY 14, 1907.
F. K. PRIEST.
TOOL OPERATING MECHANISM.
APPLICATION FILED SEPT. 29, 1905.
2 SHEETS—SHEET 1.
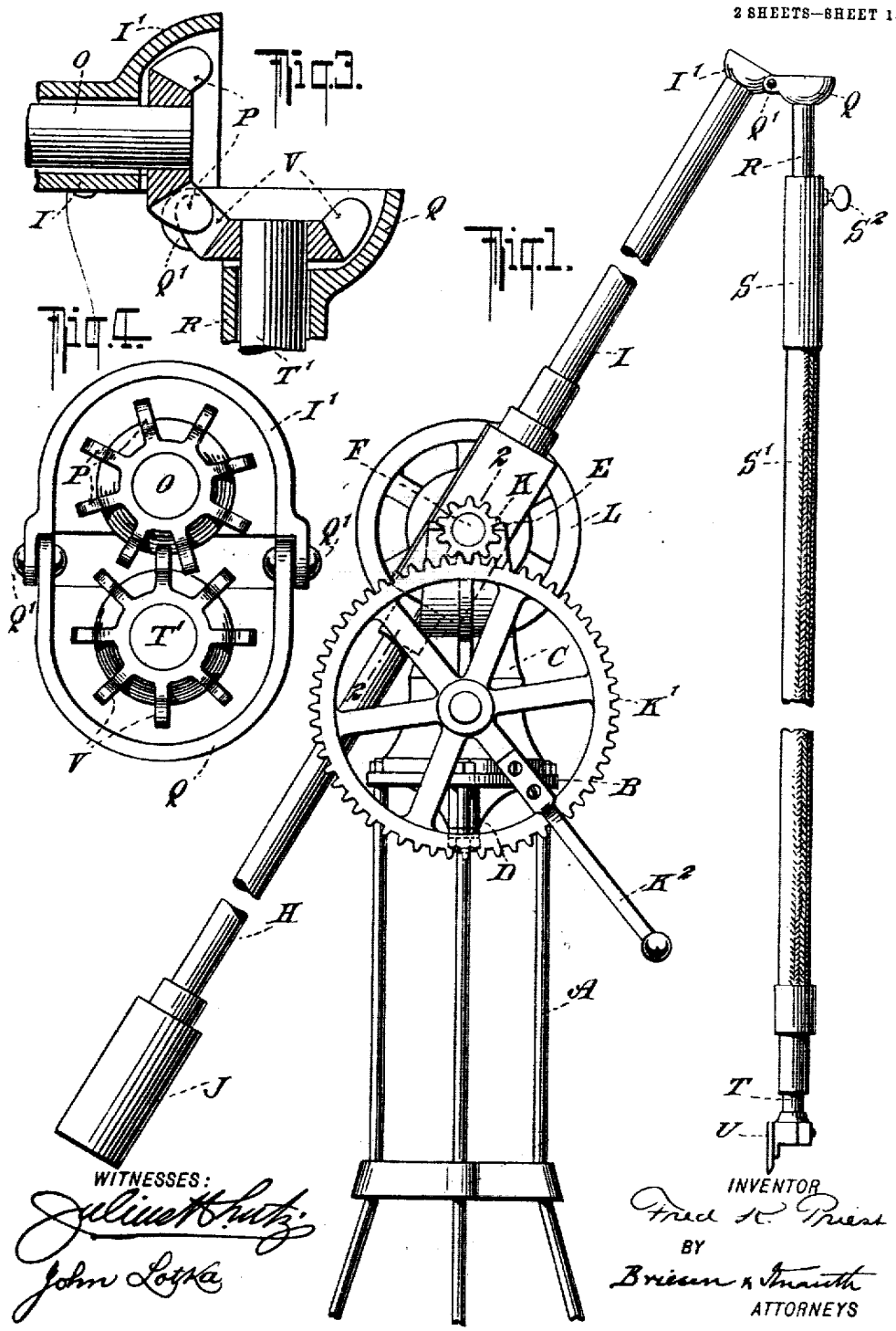

No. 853,564. PATENTED MAY 14, 1907.
F. K. PRIEST.
TOOL OPERATING MECHANISM.
APPLICATION FILED SEPT. 29, 1905.
2 SHEETS—SHEET 2.
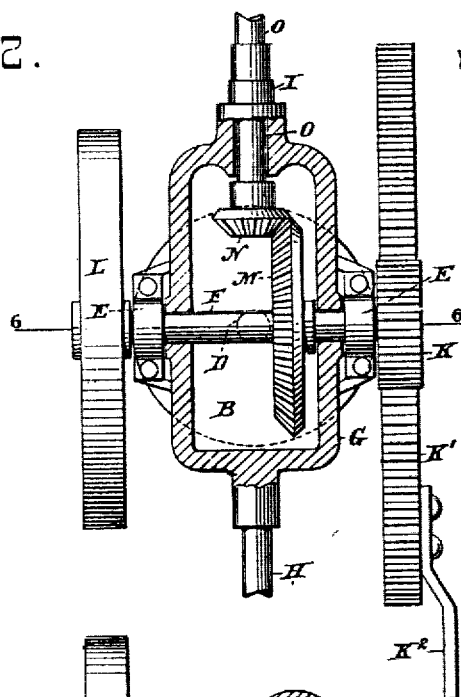
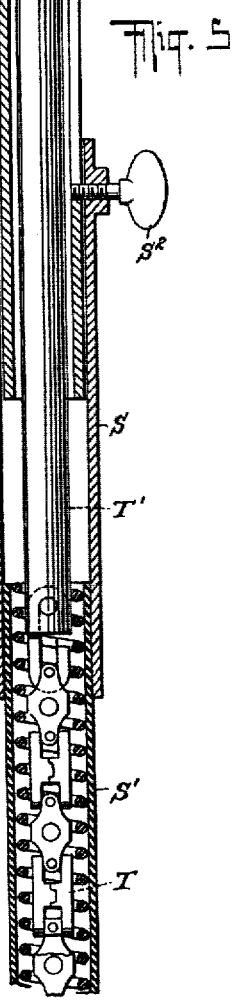
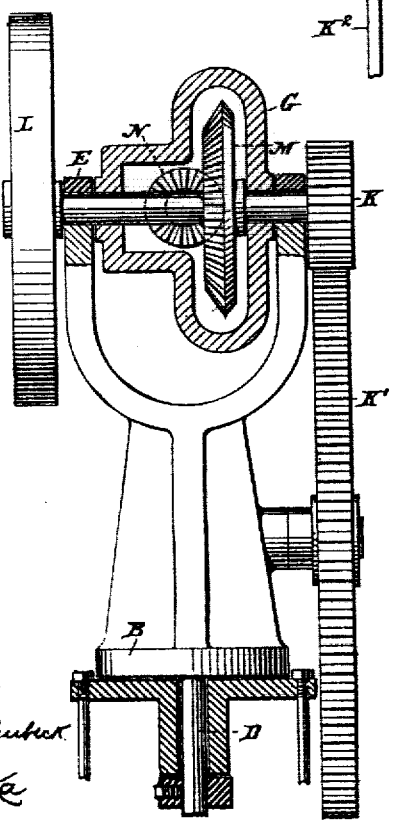
WITNESSES
John A. Kellenbach
John Locka
INVENTOR
Fred K. Priest
BY Breren & Knauth
his ATTORNEYS

UNITED STATES PATENT OFFICE.

FRED K. PRIEST, OF HILLSBORO, NEW HAMPSHIRE.

TOOL-OPERATING MECHANISM.

No. 853,564.      Specification of Letters Patent.      Patented May 14, 1907.

Application filed September 29, 1905. Serial No. 280,599.

*To all whom it may concern:*

Be it known that I, FRED K. PRIEST, a citizen of the United States, and a resident of Hillsboro, county of Nashua, State of New Hampshire, have invented certain new and useful Improvements in Tool-Operating Mechanisms, of which the following is a specification.

My invention relates to mechanical devices such as are driven by hand or by power and has for its object to provide devices of this description with a positive driving mechanism.

Other objects will appear from the annexed detail description and the features of novelty will be pointed out in the appended claims.

In the drawings Figure 1 is a side elevation of my improved machine, Fig. 2, is an enlarged detail section of a portion thereof on line 2—2 of Fig. 1; Fig. 3 is an enlarged detail section of the driving connection to the flexible shaft; Fig. 4 is a plan view thereof Fig. 5 is a partial section of the flexible shaft connection and Fig. 6 is a detail sectional view on the line 6—6 of Fig. 2.

A represents a stand or tripod having a table B. A forked support C is mounted on the table B so as to be capable of being rotated about a vertical pivot D. The two members of the forked support C are provided at their free ends with bearings E in which is mounted a shaft F. A hollow casing G is supported on the shaft F in such a manner as to be capable of being rocked therein and has secured to it two members H & I which form the balance arm of the machine. The member H of this balance arm is provided at its free end with a weight J. The member I is hollow and carries at its upper or free end a cup I' the purpose of which will be more clearly described hereinafter. On the shaft F is secured a pinion K which meshes with a gear wheel K' suitably supported on the forked support C. A fly wheel L is also carried by the shaft F. A bevel gear M is mounted on the shaft F to turn therewith at a point inside of the casing G. This bevel gear M meshes with a bevel pinion N secured to a shaft O which extends through the hollow member I and carries at its other end a crown gear P in the cup I'. A cup Q similar to the cup I' is pivoted to said cup I' at Q' and has secured to it a hollow member R having a slot R' and which extends into another hollow member S, to which is secured the usual cover S' for protecting the flexible shaft T. The members R & S are adjustably secured together by means of a thumb screw $S^2$ in such a manner that when the flexible shaft T, which carries at its free end the usual clipper or cutter U, is bent to different positions the member S' may ride up and down on the member R, said member S being guided in the member R by the end of the screw $S^2$ sliding in the slot R'. A crown gear V similar to the crown gear P and meshing therewith is mounted in the cup Q and is secured to the shaft T' to the end of which the flexible shaft T is fastened. The crown gears P and V have the teeth made in such a manner that no matter in what positions the cups I' and Q may be as the machine is used and the flexible shaft and cutter are moved about, the said crown gears will always remain in mesh.

In operation power is applied to the gear wheel K' in any suitable manner as by means of a handle $K^2$, thus driving the pinion K and the shaft F and with it the bevel gear M and the fly wheel I. The bevel gear M being in mesh with the pinion N transmits motion thereto and thus drives the shaft O and with it the crown gear P. This crown gear P in turn drives the crown gear Q and rotates the shaft T' and the flexible shaft T and thus operates the clipper or cutter U. With my construction a positive drive is thus obtained together with all the resulting advantages over a belt transmission, that is the highest speed for the amount of power applied is obtained, and the danger of the belt stretching, slipping and breaking is done away with. My device is also very compact and easy to manufacture.

Various modifications may be made without departing from the nature of my invention.

I claim and desire to secure by Letters Patent,

1. The combination of the stand, the support pivoted to the stand to swing in a horizontal plane, the casing pivoted to the upper portion of the support to swing in a vertical plane, the shaft co-axial with said casing, the drive wheel journaled on the support below the first named shaft and having a driving connection therewith, the balance arm rigidly connected with the casing, another shaft journaled in the balance arm and extending lengthwise thereof, meshing gears on the said shafts, and a flexible shaft operatively connected with the shaft in the balance arm.

2. The combination of the stand, the support pivoted to the stand to swing in a horizontal plane, the casing pivoted to the upper portion of the support to swing in a vertical plane, the shaft co-axial with said casing, the drive wheel journaled on the support below the first named shaft and having a driving connection therewith, the balance arm rigidly connected with the casing, another shaft journaled in the balance arm and extending lengthwise thereof, and meshing gears on the said shafts.

3. The combination of the stand, the support pivoted to the stand to swing in a horizontal plane, the casing pivoted to the support to swing in a vertical plane, the shaft co-axial with said casing, means for turning said shaft, the balance arm rigidly connected with the casing, another shaft journaled in the balance arm and extending lengthwise thereof, and a driving connection between said shafts.

In testimony whereof I have signed this specification in the presence of two subscribing witnesses.

FRED K. PRIEST.

Witnesses:
JOSEPH L. CLOUGH,
WM. A. NELSON.